July 17, 1951    C. W. KNOTT    2,560,875
FISH CATCHER
Filed July 8, 1949
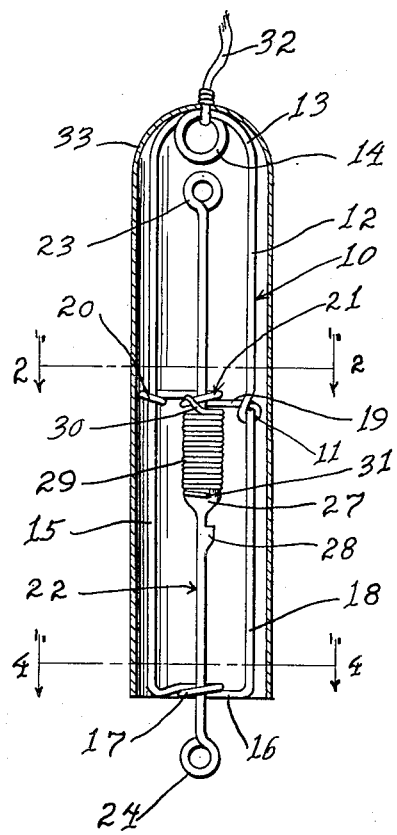
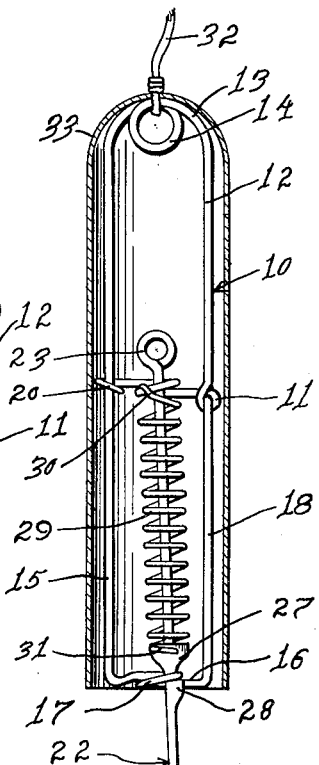
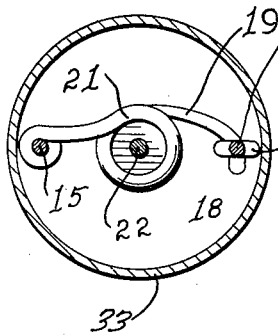
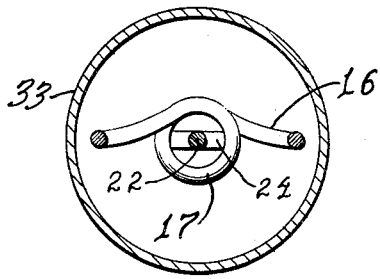
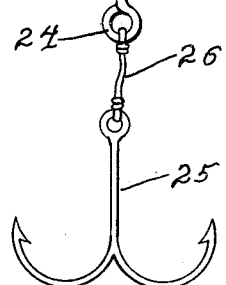
INVENTOR.
Charles W. Knott
BY
Attorney

UNITED STATES PATENT OFFICE 2,560,875

FISH CATCHER

Charles W. Knott, Santa Barbara, Calif.

Application July 8, 1949, Serial No. 103,699

1 Claim. (Cl. 43—15)

This invention relates to fishing tackle and the primary object of the invention is to provide a fish catcher comprising a spring biased hook adapted to be jerked upwardly by the spring whenever a fish nibbles on the bait attached to the hook.

Another object of the invention is to provide a fish catcher of the character indicated above, the hook of which is linked to a wire rod slidably arranged in an elongated frame and surrounded by the spring which urges upwardly the rod and the hook linked thereto.

A further object of the invention is to provide a fish catcher of the character indicated above, the frame of which is preferably made from one continuous piece of wire which is bent to form, at the upper transverse member of the frame, an eye adapted to be engaged by a fishing line.

A still further object of the invention is to provide a fish catcher of the character indicated above, the wire forming the frame of which is bent to form at the lower transverse member of the frame a centrally located eye receiving a wire rod slidable therein, the frame having an intermediate transverse member shaped into an eye located coaxially above the lower eye and adapted to slidably receive the wire rod.

An additional object of the invention is to provide a fish catcher of the character indicated above, the wire rod of which is equipped intermediate its ends with a shoulder jutting out radially from the wire rod, said rod being adapted to slide through the eye formed on the lower transverse frame member and to engage said eye upon slight outward movement of the rod.

Another object of the invention is to provide a fish catcher of the character indicated above, which is provided with a circumferentially grooved member secured on the wire rod above the stop shoulder, with the lower end portion of the spring attached to the grooved member and the upper end portion of the spring attached to the intermediate transverse frame member.

The invention consists in the details of construction and in the combination and arrangement of the several parts of my improved fish catcher whereby certain advantages are attained, as will be hereinafter more fully set forth.

In order that my invention may be better understood, I will now proceed to describe the same with reference to the accompanying drawings, wherein:

Figure 1 is a view partly in elevation and partly in section of a fish catcher constructed in accordance with an embodiment of the invention;

Figure 2 is a sectional view taken substantially on the line 2—2 of Figure 1;

Figure 3 is a view similar to Figure 1 with certain of the parts in a set position; and Figure 4 is a sectional view taken substantially on the line 4—4 of Figure 1.

The fish catcher as embodied herein comprises an elongated frame 10 preferably made from one continuous piece of wire. At one end of the wire a starting eye 11 is formed after which the wire extends upwardly to form the upper portion 12 of one of the longitudinal frame members, then the wire is bent to form the upper transverse frame member 13 centrally of which a substantially vertical eye 14 is provided. The wire extends downwardly substantially parallel to the frame member portion 12 and forms the longitudinal frame member 15 which extends further down than the portion 12. At the lower end of the frame member 15 the wire is bent to extend transversely to form the lower transverse frame member 16 centrally of which a substantially horizontal guide eye 17 is formed. Then the wire is bent upwardly to form the lower longitudinal frame portion 18. The wire then extends through the starting eye 11 and is bent to form the intermediate transverse frame member 19, the end portion of which is secured to the longitudinal frame member 15 as at 20. Centrally of the intermediate transverse frame member 19 a substantially horizontal guide eye 21 is formed so that it is disposed approximately coaxially with the guide eye 17.

A wire rod 22 is slidably disposed in the two guide eyes 17 and 21 and the upper end portion of said wire rod is formed into an end eye 23 and the lower end portion of the wire is formed into an eye 24 to which a fish hook unit 25 may be attached by a snell 26 or the like. A circumferential shoulder 27 is provided on the wire rod 22 below the upper guide eye 21. This shoulder 27 is preferably formed by securing on the rod a circumferentially grooved cylindrical piece of metal of greater diameter than the wire rod.

Below the circumferential shoulder 27 and spaced therefrom a radially extending stop shoulder 28 is formed at one side of the wire rod 22. The stop shoulder 28 is small enough to permit the rod to slide through the lower guide eye 17.

A helical spring 29 is arranged about the wire rod 22. The upper end portion 30 of said spring is secured to the intermediate transverse member 19 and the lower end portion 31 of the spring is fastened to the shoulder piece 27 so that the spring 29 normally pulls the rod 22 upwardly in the position shown in Figure 1. When the fish catcher is to be used it is tied to a fish line 32 extending through the eye 14. Bait (not shown) is attached to the hook unit 25 in any suitable conventional manner and the wire rod 22 is pulled downwardly until the stop shoulder 28 is located below the lower guide eye 17. The wire rod 22 is pushed laterally so that the stop shoulder 28 engages the lower surface of the guide eye 17 under the pull of the spring 29, but prevents said spring from forcing the rod into idle position. When a fish nibbles on the bait the stop shoulder 28 slides from the eye 17 and the wire rod 22 and the hook unit 25 is jerked upwardly by the spring 29 snagging and securely hooking the fish.

In this manner a fish not actually biting but only nibbling at the bait is caught.

In order to prevent the action of the spring 22 being hindered and the movements of the wire members of the fish catcher being impeded by weeds or the like, a tubular cover 33 surrounds the frame 10 and is large enough to permit free play of the fish catcher.

From the foregoing description it is thought to be obvious that a fish catcher constructed in accordance with my invention is particularly well adapted for use by reason of the convenience and facility with which it may be assembled and used.

I claim:

In a fish catcher, an elongated frame having spaced upper, lower and intermediate transverse portions, a guide eye formed on the lower transverse portion, and a similar eye formed on the intermediate transverse portion, a rod slidably supported in said eyes, a spring disposed in the frame and surrounding the rod, a circumferential shoulder formed on the rod, one end portion of the spring being attached to the intermediate transverse portion and the other end portion of the spring being attached to the circumferential shoulder of the rod, and a stop shoulder extending radially from the rod at one side thereof below said circumferential shoulder, said stop shoulder being adapted to slide through the lower guide eye and adapted to engage said eye upon sideways movement of the rod, said upper portion constituting means for connecting the fish catcher to a line.

CHARLES W. KNOTT.

REFERENCES CITED

The following references are of record in the file of this patent:

UNITED STATES PATENTS

| Number | Name | Date |
|---|---|---|
| 1,012,899 | Nelson | Dec. 26, 1911 |
| 1,989,407 | De Witt | Jan. 29, 1935 |
| 2,203,618 | Paxton | June 4, 1940 |